United States Patent [19]

Sato et al.

[11] 4,141,597
[45] Feb. 27, 1979

[54] PRESSURE CONTROL VALVE FOR USE IN AN ANTILOCK BRAKE CONTROL SYSTEM

[75] Inventors: Takefumi Sato, Tenri; Yuji Dohi, Nara, both of Japan

[73] Assignee: Sharp Kabushiki Kaisha, Osaka, Japan

[21] Appl. No.: 762,110

[22] Filed: Jan. 24, 1977

[30] Foreign Application Priority Data

Jan. 23, 1976 [JP] Japan .................... 51-6842

[51] Int. Cl.$^2$ ............................... B60T 8/04
[52] U.S. Cl. .................................... 303/119
[58] Field of Search ............. 303/123, 119, 68; 188/181 A; 137/513.5, 513.7

[56] References Cited

U.S. PATENT DOCUMENTS

| | | | |
|---|---|---|---|
| 590,892 | 9/1897 | Knight | 137/513.7 X |
| 1,788,358 | 1/1931 | Goerg | 137/513.7 |
| 2,623,725 | 12/1952 | Sands | 137/513.7 X |
| 3,717,385 | 2/1973 | Michellone et al. | 303/119 |

FOREIGN PATENT DOCUMENTS 2235027  1/1975  France ..................... 303/119

*Primary Examiner*—George E. A. Halvosa
*Attorney, Agent, or Firm*—Birch, Stewart, Kolasch and Birch

[57] ABSTRACT

In an oil pressure controlled brake system, wherein the brake oil contained within a wheel cylinder is returned to an oil reservoir associated with a master cylinder through an electromagnetic cross valve when the wheel lock or impending lock is detected. The brake system includes a pressure control valve interposed within a feedback loop connecting the electromagnetic cross valve to the oil reservoir. The pressure control valve is so constructed as to suddenly reduce the wheel cylinder pressure to a predetermined value and then gradually reduce the wheel cylinder pressure while the electromagnetic cross valve is energized.

4 Claims, 6 Drawing Figures

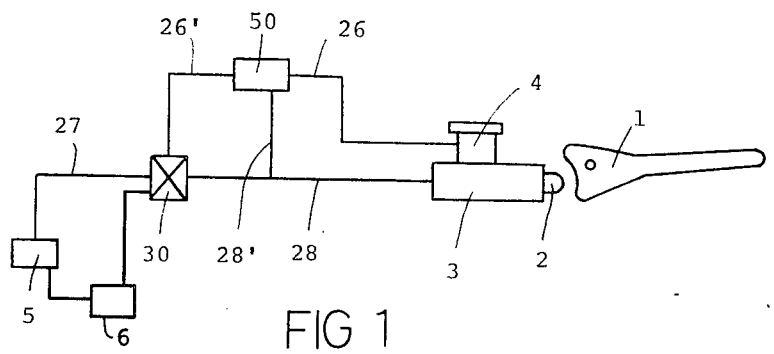
FIG 1
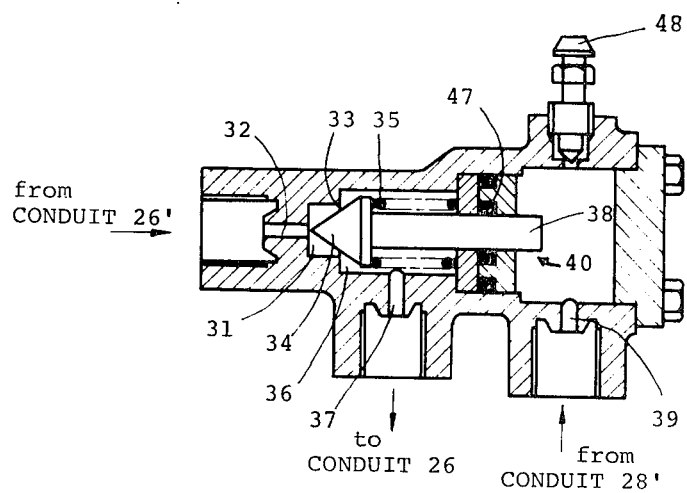
FIG 2
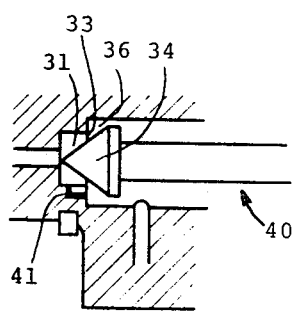
FIG 3
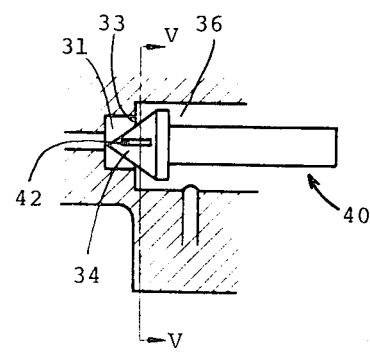
FIG 5
FIG 4

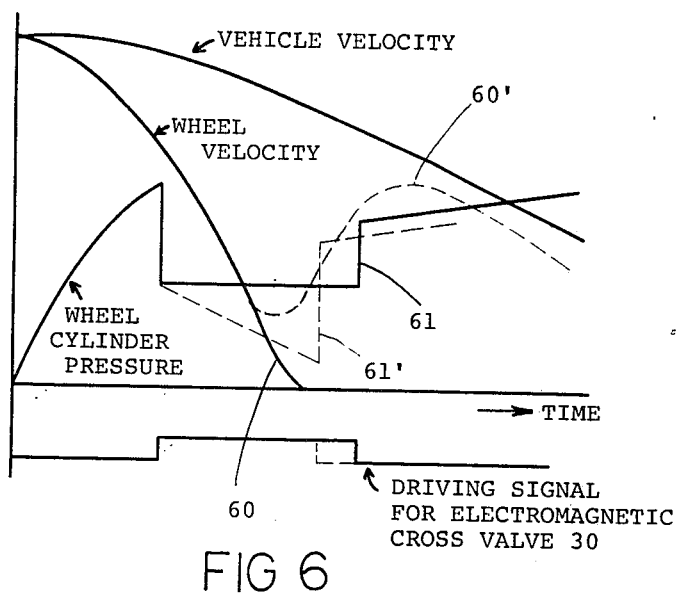

PRESSURE CONTROL VALVE FOR USE IN AN ANTILOCK BRAKE CONTROL SYSTEM

BACKGROUND AND SUMMARY OF THE INVENTION

The present invention relates to an antilock brake control system for a motorcycle front wheel and, more particularly, to a pressure control valve for use in an antilock brake control system wherein the brake oil contained within a wheel cylinder is returned to an oil reservoir associated with a master cylinder through the pressure control valve when the wheel lock or impending lock is detected.

In the conventional prior art antilock brake control system, a diaphragm type pressure difference detection means is provided for controlling the application of the oil pressure from a master cylinder to a wheel cylinder. An electromagnetic cross valve associated with the pressure difference detection means is provided for creating the pressure difference within the pressure difference detection means when the wheel lock or impending lock is detected, thereby inhibiting the application of the oil pressure from the master cylinder to the wheel cylinder and reducing the oil pressure within the wheel cylinder.

The diaphragm type pressure difference detection means is unavoidably required in the above-mentioned antilock brake control system, and this results in a large antilock brake control system. Moreover, the diaphragm type pressure difference detection means requires a vacuum source and, therefore, the antilock brake control system of the prior art is not applicable to a motorcycle. To solve the above problems, a novel antilock brake control system has been developed, wherein the brake oil contained within a wheel cylinder is returned to an oil reservoir associated with a manually actuated master cylinder when the wheel lock or impending lock is detected. This antilock brake control system is described in copending U.S. application, "ANTILOCK BRAKE CONTROL SYSTEM FOR A MOTORCYCLE FRONT WHEEL", Ser. No. 756,834, filed on Jan. 5, 1977 by Takefumi SATO and assigned to the same assignee as the present application.

In the antilock brake control system described in the above-mentioned copending application, an electromagnetic cross valve responsive to the detected wheel lock or impending lock is provided for returning the brake oil from the wheel cylinder to the master cylinder by selectively energizing the electromagnetic cross valve. In addition, a pressure control valve is interposed within a feedback loop from the electromagnetic cross valve to the master cylinder, whereby the oil pressure in the wheel cylinder is controlled not to fall below a predetermined value fixed by the pressure control valve.

Although the above-mentioned antilock brake control system is simple and suited for the motorcycle front wheel, there is a possibility that the wheel revolution is not recovered, or, the wheel is completely locked even though the electromagnetic cross valve is energized. This is due to the fact that the pressure control valve employed in the above-mentioned antilock brake control system is so constructed as not to reduce the wheel cylinder pressure below the predetermined value when the electromagnetic cross valve is energized.

Accordingly, an object of the present invention is to provide an antilock brake control system of a simple construction.

Another object of the present invention is to provide an antilock brake control system applicable to a front wheel of a motorcycle.

Still another object of the present invention is to provide a novel pressure control valve for use in an antilock brake control system, wherein the brake oil contained within a wheel cylinder is returned to an oil reservoir associated with a master cylinder through an electromagnetic cross valve and the pressure control valve when the wheel lock or impending lock is detected.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, the brake oil contained within a wheel cylinder is returned to an oil reservoir associated with a master cylinder through an electromagnetic cross valve when the wheel lock or impending lock is detected. A pressure control valve is interposed within a feedback loop from the electromagnetic cross valve to the oil reservoir. The pressure control valve is so constructed as to suddenly reduce the wheel cylinder pressure to a preselected value and then gradually reduce the wheel cylinder pressure while the electromagnetic cross valve is energized.

In a preferred form, the pressure control valve is so constructed as to suddenly reduce the wheel cylinder pressure to a predetermined value proportional to the master cylinder pressure when the electromagnetic cross valve is energized. A bypass means is provided in the pressure control valve, whereby the brake oil is gradually returned from the wheel cylinder to the oil reservoir even when a valve means included within the pressure control valve is closed while the electromagnetic cross valve is continuously energized.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a block diagram of an antilock brake control system including a pressure control valve;

FIG. 2 is a sectional view of an example of the pressure control valve disclosed in co-pending U.S. Ser. No. 756,834, filed Jan. 5, 1977;

FIG. 3 is a partially sectional view of an essential part of an embodiment of the pressure control valve of the present invention;

FIG. 4 is a partially sectional view of an essential part of another embodiment of the pressure control valve of the present invention;

FIG. 5 is a sectional view of a valve means corresponding to section V—V of FIG. 4; and FIG. 6 is a graph for explanation of the operation of the antilock brake control system employing the pressure control valve of the present invention.

DESCRIPTION OF THE PREFERRED EMBODIMENTS

FIG. 1 shows a typical construction of an antilock brake control system, wherein the brake oil contained within a wheel cylinder is returned to an oil reservoir associated with a master cylinder through an electromagnetic cross valve and a pressure control valve when the wheel lock or impending lock is detected.

A piston 2 of a master cylinder 3 is controlled by a hand brake level 1. When an electromagnetic cross valve 30 is not energized, the oil pressure in the master cylinder 3 is applied, through conduits 28 and 27, to a wheel cylinder 5 associated with the wheel brake mechanism. When the wheel lock or impending lock is detected through the use of a conventional sensor means 6, the electromagnetic cross valve 30 is energized, whereby the communication between the conduits 28 and 27 is precluded. Upon energization of the electromagnetic valve, the conduit 27 is communicated to a conduit 26', whereby the brake oil is returned from the wheel cylinder 5 to a reservoir 4 associated with the master cylinder 3, via a conduit 26 and a pressure control valve 50. Thus, the wheel cylinder pressure is reduced to a value determined by the pressure control valve 50.

The pressure control valve 50 functions to reduce the wheel cylinder pressure to a predetermined value when the electromagnetic cross valve 30 is energized. In this example, the wheel cylinder pressure is reduced to a value proportional to the master cylinder pressure which is introduced to the pressure control valve 50 through a conduit 28'.

The above-mentioned antilock brake control system is described in copending U.S. Patent application, "ANTILOCK BRAKE CONTROL SYSTEM FOR A MOTORCYCLE FRONT WHEEL", Ser. No. 756,834 filed on Jan. 5, 1977 by Takefumi SATO and assigned to the same assignee as the present application.

FIG. 2 shows an example of the pressure control valve 50 described in the above-mentioned copending U.S. application.

Referring to FIG. 2, is the normal condition, a valve 34 is depressed left by a spring 35 and is forced to come into contact with a valve seat 33. In the normal braking operation, the electromagnetic cross valve 30 will not be energized and, therefore, a valve member 40 does not shift its position because the valve member 40 only receives the master cylinder pressure, which depresses the valve member 40 towards the left by applying pressure to the right end surface of a piston 38. When the electromagnetic cross valve 30 is energized upon detection of the wheel lock or impending lock, the brake oil contained within the wheel cylinder 5 is introduced into the pressure control valve 50 through the conduit 26' and a port 32. The wheel cylinder pressure introduced into the pressure control valve 50 depresses the valve 34 towards the right. When the wheel cylinder depression force is greater than the force depressing the valve member 40 towards the left, the valve member 40 is shifted towards the right to release the valve 34 from the valve seat 33. In this manner, the brake oil contained in the wheel cylinder 5 is returned to the reservoir 4 through another port 37 and the conduit 26, whereby the wheel cylinder pressure is reduced.

With this reduction of the wheel cylinder pressure, when the force depressing the valve member 40 towards the right becomes smaller than the force depressing it towards the left, the valve 34 is again brought into contact with the valve seat 33. When the valve 34 is closed it precludes the return of the brake oil, or the reduction of the wheel cylinder pressure. In operation the wheel cylinder pressure is reduced to a value proportional to the brake oil pressure created in the master cylinder 3. The ratio between the lowermost pressure in the wheel cylinder 5 and the pressure created in the master cylinder 3 is mainly determined by the section of the piston 38 and the aperture of the valve seat 33.

The spring 35 functions to force the valve 34 to come into contact with the valve seat 33 even when the master cylinder pressure is zero. The spring force must be greater than the frictional force caused by an oil seal 47. Number 48 represents an air vent.

The operation of the above-mentioned antilock brake control system will be described with reference to FIG. 6. FIG. 6 shows variations of vehicle velocity, wheel velocity, wheel cylinder pressure and driving signal applied to the electromagnetic cross valve 30.

When the pressure control valve shown in FIG. 2 is employed in the antilock brake control system, the wheel cylinder pressure is reduced to the value proportional to the master cylinder pressure upon energization of the electromagnetic cross valve 30, and thus reduced wheel cylinder pressure is maintained while the electromagnetic cross valve 30 is energized as shown by a curve 61 in FIG. 6. Therefore, there is a possibility that the wheel revolution is completely locked as shown by a curve 60 in FIG. 6 even though the electromagnetic cross valve 30 is continuously energized. This will occur with a great probability when the vehicle travels on the muddy road.

The present invention is to eliminate the above-mentioned undesirable operation. More particularly, the present invention relates to an improvement on the pressure control valve, which can eliminate the above-mentioned undesirable operation.

FIG. 3 shows an embodiment of the pressure control valve of the present invention. FIG. 3 only shows an essential part of the pressure control valve, since the remaining portions are the same construction as the pressure control valve shown in FIG. 2. Like elements corresponding to those of FIG. 2 are indicated by like numerals.

A narrow passage 41 is formed between a chamber 31 and another chamber 36 for communicating the conduit 26' and the conduit 26 to each other even when the valve 34 is brought into contact with the valve seat 33. Therefore, the brake oil is returned from the wheel cylinder 5 to the master cylinder 3 even when the valve 34 is brought into contact with the valve seat 33 as long as the electromagnetic cross valve 30 is energized. The wheel cylinder pressure is suddenly reduced to the value proportional to the pressure created in the master cylinder 3 upon energization of the electromagnetic cross valve 30, and, thereafter, gradually reduced while the electromagnetic cross valve 30 is energized as shown by a broken line curve 61' in FIG. 6.

The obtained sequence of sudden reduction and gradual reduction of the wheel cylinder pressure is very effective to perform the preferred brake operation. The wheel revolution will be recovered as shown by a broken line curve 60' in FIG. 6 and the energization of the electromagnetic cross valve 30 is terminated, since the wheel revolution sensing means detects the recovery of the wheel revolution.

FIGS. 4 and 5 show an essential part of another embodiment of the pressure control valve of the present invention. FIG. 5 is a sectional view of the valve member 40 corresponding to section V—V of FIG. 4. Like elements corresponding to those of FIG. 3 are indicated by like numerals.

A groove 42 is formed on the surface of the valve 34 in order to communicate the chamber 31 and the chamber 36 to each other even when the valve 34 is brought into contact with the valve seat 33. The pressure control valve shown in FIGS. 4 and 5 functions in a same manner as achieved by the pressure control valve shown in FIG. 3. The groove 42 will be cleaned upon every shift operation of the valve member 40, whereby the groove 42 is prevented from blocking.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In an antilock brake control system including a master cylinder and a through conduit, a wheel cylinder, means for detecting the wheel lock or impending lock, means for returning the brake oil contained within the wheel cylinder to a reservoir associated with the master cylinder when the wheel lock or impending lock is detected, said returning means including an electromagnetic cross valve for controlling the supply direction of the brake oil in response to the detecting means and a pressure control valve interposed within a feedback loop from the electromagnetic cross valve to the reservoir and being responsive to a brake oil pressure in the through conduit, said pressure control valve comprising:
a valve member for suddenly reducing the wheel cylinder pressure to a predetermined value continuously proportional to the pressure created in said master cylinder upon energization of said electromagnetic cross valve; and
means for gradually reducing the wheel cylinder pressure while the electromagnetic cross valve is energized.

2. The antilock brake control system of claim 1, wherein the means for gradually reducing the wheel cylinder pressure comprises a narrow passage for communicating the electromagnetic cross valve to the reservoir through said feedback loop without regard to the condition of the valve member.

3. The antilock brake control system of claim 1, wherein the means for gradually reducing the wheel cylinder pressure comprises a groove formed on the valve member for conducting the brake oil even when the valve member is placed in the closed condition.

4. In an antilock brake control system including a master cylinder and a through conduit, a wheel cylinder, means for detecting wheel lock or impending lock, a feedback conduit for returning the brake oil contained within the wheel cylinder to a reservoir associated with the master cylinder when wheel lock or impending lock is detected, said feedback conduit and through conduit being controlled by an electromagnetic cross valve for controlling the supply direction of the brake oil in response to the detecting means and a pressure control valve interposed within the feedback conduit from the electromagnetic cross valve to the reservoir and being responsive to a brake oil pressure in the through conduit from said master cylinder and a brake oil pressure in said feedback conduit from said wheel cylinder, said pressure control valve comprising:
a valve member for suddenly reducing the wheel cylinder pressure to a predetermined value continuously proportional to the pressure created in said master cylinder upon energization of said electromagnetic cross valve:
means for gradually reducing the wheel cylinder pressure while the electromagnetic cross valve is energized comprising a groove formed on the valve member for conducting the brake oil even when the valve member is placed in the closed condition.

* * * * *